United States Patent [19]

Wittman

[11] Patent Number: 4,595,802
[45] Date of Patent: Jun. 17, 1986

[54] HYBRID CIRCUIT

[75] Inventor: John P. Wittman, Raleigh, N.C.

[73] Assignee: Northern Telecom Limited, Montreal, Canada

[21] Appl. No.: 555,971

[22] Filed: Nov. 29, 1983

[51] Int. Cl.[4] ............................................. H04B 1/58
[52] U.S. Cl. ......................... 179/170 D; 179/170 NC
[58] Field of Search ............ 179/16 A, 16 AA, 18 FA, 179/70, 77, 81 B, 170 R, 170 D, 170 NC; 333/17 M, 25, 117, 119, 131, 132, 177, 178

[56] References Cited

U.S. PATENT DOCUMENTS

| | | |
|---|---|---|
| 2,946,861 | 7/1960 | Chen . |
| 3,130,274 | 4/1964 | Norling et al. ................. 179/170 D |
| 4,197,431 | 4/1980 | Vis .................................. 179/170 R |
| 4,232,293 | 11/1980 | Harris . |
| 4,322,586 | 3/1982 | Mein et al. . |
| 4,346,266 | 8/1982 | Brockmann et al. . |
| 4,346,267 | 8/1982 | Dijkmans . |
| 4,378,472 | 3/1983 | Lechner ......................... 179/170 D |
| 4,491,700 | 1/1985 | Tahara et al. ................. 179/170 NC |

FOREIGN PATENT DOCUMENTS 0122582  9/1981  Japan ............................ 179/170 D Primary Examiner—Gene Z. Rubinson
Assistant Examiner—Randall P. Myers
Attorney, Agent, or Firm—Schwartz, Jeffery, Schwaab, Mack, Blumenthal & Evans

[57] ABSTRACT

A hybrid circuit having low return loss and low transhybrid loss is disclosed. An operational amplifier is employed in a feedback configuration. The receive port of the hybrid circuit is applied to the non-inverting input of the amplifier while the center-tap of the secondary winding of the hybrid transformer is applied to the inverting input of the amplifier. Most noticeable is the omission of an impedance setting resistor at the output of the operational amplifier. The circuitry connected to the transmit port and the two-wire bidirectional port of the hybrid circuit are of conventional design.

9 Claims, 3 Drawing Figures

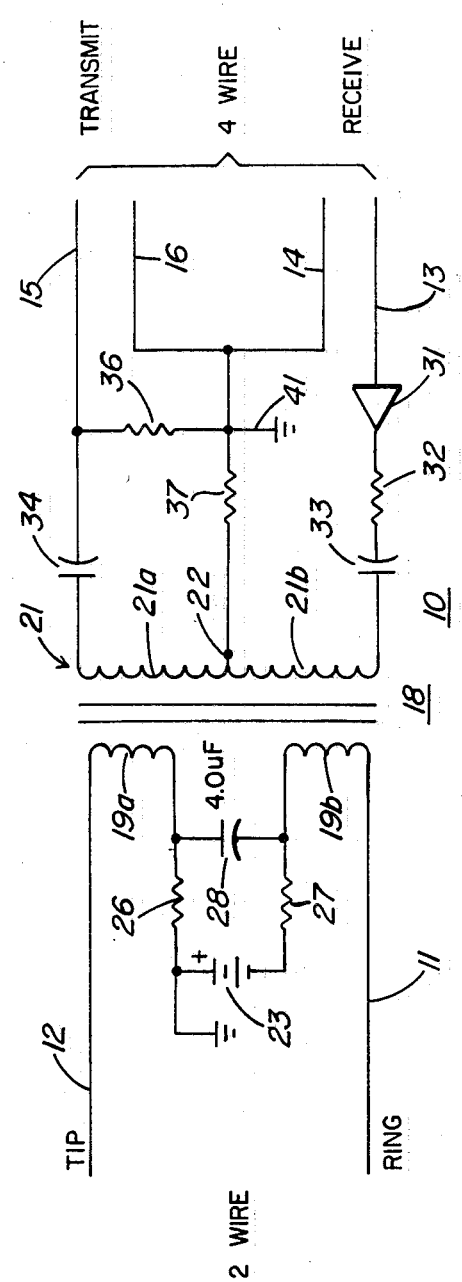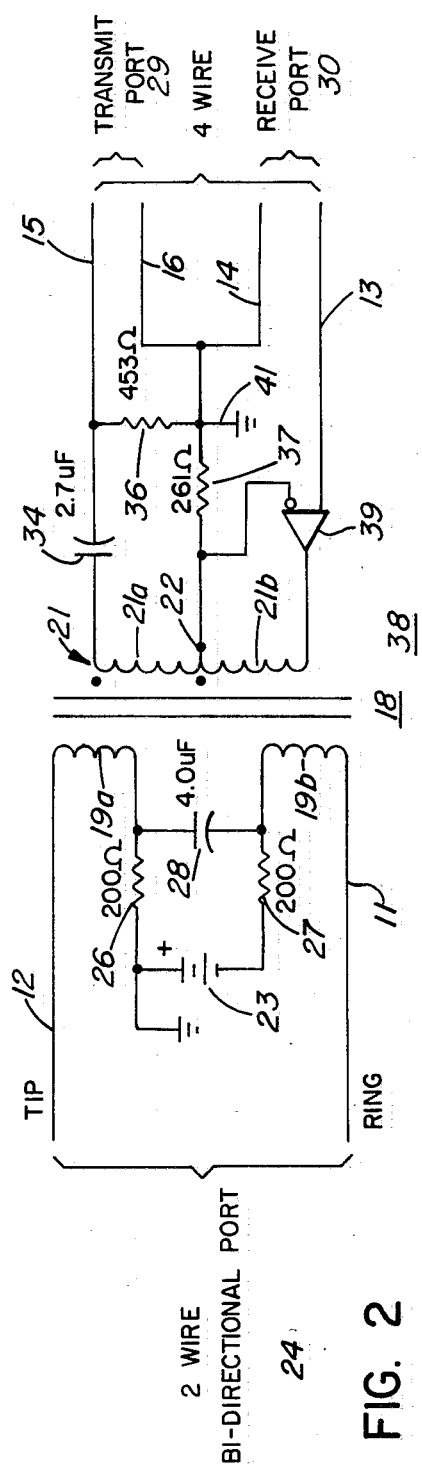
FIG. 1 PRIOR ART
FIG. 2

HYBRID CIRCUIT

BACKGROUND OF THE INVENTION

This invention relates generally to hybrid circuits, and more particularly to a hybrid circuit for interfacing a two-wire line and a four-wire line.

In telephone systems and the like it is often necessary to couple a four-wire line to a two-wire line. More specifically, the four-wire line comprises two wires that provide a receive path for signals and two wires that provide a transmit path for signals. The two-wire line provides both a receive path and a transmit path on a common pair of wires. Most frequently, the two-wire line extends from a subscriber's telephone set to a switching office. At the switching office it is common to convert the two-wire bidirectional line to the four-wire (two unidirectional paths) line by use of a hybrid circuit.

Hybrid circuits are well known and the following patents describe but a few of the known techniques in this field: U.S. Pat. No. 2,946,861 dated July 26, 1960 by Li-Yen Chen; U.S. Pat. No. 4,232,293 by H. H. Harris dated Nov. 4, 1980; U.S. Pat. No. 4,322,586 dated Mar. 30, 1982 by G. F. Mein and J. B. Terry; U.S. Pat. No. 4,346,266 dated Aug. 24, 1982 by Brockmann et al; and U.S. Pat. No. 4,346,267 dated Aug. 24, 1982 by E. C. Dijkmans. Attention is respectfully directed to the above listed patents.

Desired objects for a hybrid circuit of this type are to maximize the return loss and to increase the efficiency of the hybrid circuit. Previously this has been accomplished by the use of two R-C (resistor-capacitor) networks on the four-wire side (note: this is depicted in more detail in FIG. 1). Another object is to maximize the transhybrid loss.

SUMMARY OF THE INVENTION

The present invention is directed to increasing the efficiency of a hybrid circuit while maintaining relatively high return loss and relatively high transhybrid loss. In simplistic terms, this is achieved by eliminating one of the R-C networks of the prior art hybrid circuit referred to above, and replacing it with an operational amplifier.

Stated in other terms, the present invention is a hybrid circuit for interfacing a two-wire bidirectional line and a pair of two-wire unidirectional lines, the hybrid circuit comprising: a transformer having two primary windings and a center tapped secondary winding; the primary windings being interconnected in a voltage aiding serial relationship, by a capacitance means; an operational amplifier having a first input responsive to the signal on a first one of the unidirectional lines, having its second input responsive to the signal on the center tap of the secondary winding, and having its output applied to a first end of the secondary winding; and a balancing network connected between the center tap and ground; the second one of the unidirectional lines being responsive to the signal on the second end of the secondary winding.

BRIEF DESCRIPTION OF THE DRAWINGS

The invention will now be described in more detail with reference to the accompanying drawings, wherein like parts in each of the several figures are identified by the same reference character, and wherein:

FIG. 1 is a simplified schematic of a prior art hybrid circuit;

FIG. 2 is a simplified schematic of the preferred embodiment of the hybrid circuit of the present invention.

DETAILED DESCRIPTION

Figure 3:
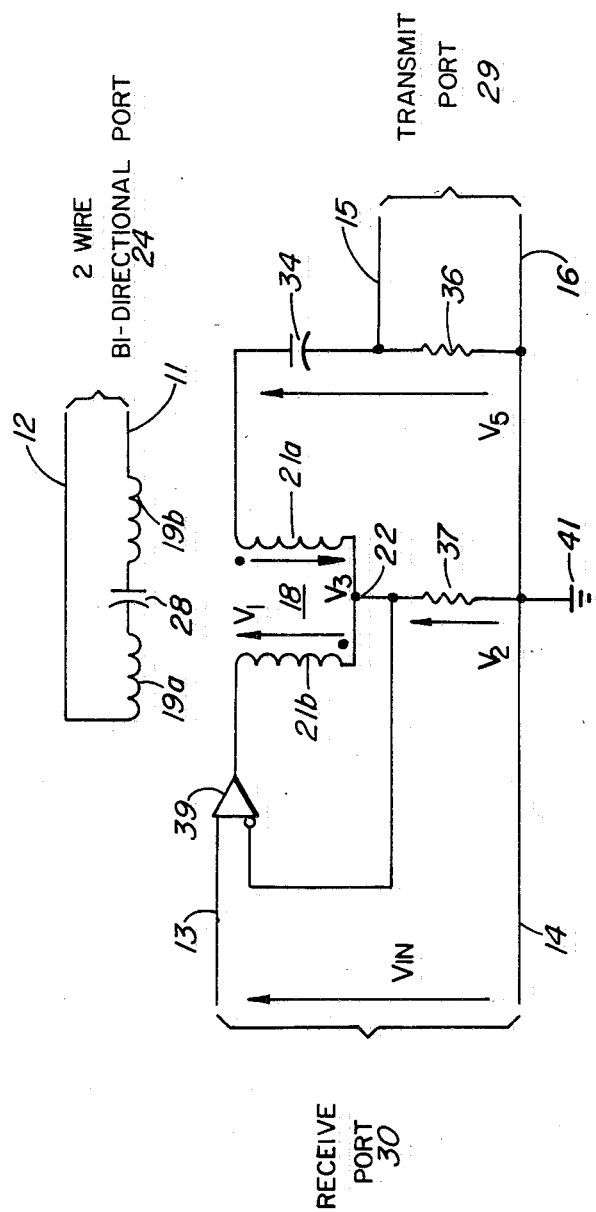
FIG. 3 is a further simplification of, and re-orientation of, the FIG. 2 circuit.

FIG. 1 depicts a simplified prior art hybrid circuit 10 used for interfacing TIP wire 12 and RING wire 11 of a subscriber's loop both to wires 13 and 14 forming a two-wire receive line and to wires 16 and 17 forming a two-wire transmit line.

Transformer 18 has split primary windings 19a and 19b and a secondary winding 21 comprised of two equal sections 21a and 21b with a center tap connection at 22.

A battery 23 is depicted connected to the primary windings 19a and 19b via feed resistors 26 and 27 for supplying DC power to equipment connected to the subscriber's loop (e.g. a telephone set). Capacitor 28 connects windings 19a and 19b in a series circuit relationship so as to allow the passage of AC signals while blocking the flow of DC current.

Signals from a switching office (not shown) are received on wires 13 and 14. The signal on wire 13 is applied to amplifier 31, thence to the series combination of resistor 32 and capacitor 33 and to one end of winding 21b.

Signals destined for the switching office (not shown) are applied to wires 15 and 16. These signals are taken from one end of winding 21a (as depicted in FIG. 1) and are applied via capacitor 34 to wire 15. Resistor 36 between wire 15 and ground is the termination of the transmit port of hybrid 10 and resistor 37 is the balancing resistor.

As is apparent from the FIG. 1 embodiment, the signal received on wires 13 and 14 experiences loss due to capacitor 33 and resistor 32. Similarly, the signal transmitted to the switching office (not shown) on wires 15 and 16 experiences loss due to capacitor 34 and resistor 36.

FIG. 2 depicts a simplified schematic of the preferred embodiment of hybrid circuit 38 constructed according to the present invention. The components on the subscriber's loop side of hybrid 38 (i.e. wires 11 and 12, transformer 18, resistors 26 and 27, capacitor 28, and battery 23) are the same as in FIG. 1.

On the switching office side of hybrid 38, wire 13 is applied to the non-inverting input of operational amplifier 39 (e.g. an NE 5532). The output of amplifier 39 is applied to one end of winding 21b as shown, and the other end of winding 21b (i.e. center tap connection 22) is applied to the inverting input of amplifier 39. Amplifier 39 is operated in a feedback configuration and has a gain of approximately two. A balancing network comprising resistor 37 is connected between center tap connection 22 and ground 41. The end of winding 21a, remote from tap 22, is connected to ground 41 via a matching network comprising capacitor 34 and resistor 36, and to wire 15 via capacitor 34.

Consequently, signals received on windings 19a and 19b, from tip wire 12 and ring wire 11 (i.e. bidirectional port 24) are applied to transmit wires 15 and 16 (i.e. transmit port 29); and signals received on wires 13 and 14 (i.e. receive port 30) are applied to tip wire 12 and ring wire 11.

A comparison of hybrid circuit 38 of FIG. 2 and hybrid circuit 10 of FIG. 1 shows that the resistor 32 and capacitor 33 (both of FIG. 1) that are in the receive path have been eliminated in hybrid circuit 38 of FIG. 2; consequently, the signal loss associated with these two components has also been eliminated in the FIG. 2 embodiment.

FIG. 3 is the same as FIG. 2 except that it is further simplified and has been oriented differently to facilitate the description of its operation. It is believed that the circuit of FIG. 3 (and consequently the circuit of FIG. 2) functions as follows.

The R-C termination (i.e. resistor 36 and capacitor 34) on transmit port 29 is automatically matched on the receive port 30 by forcing the signal on tap 22 to approximately zero. When the circuit of FIG. 3 is transmitting only (i.e. a signal is received from tip 12 and ring 11 and applied to wires 15 and 16) then the voltages are as follows:

(a) $V_{in}=0=V_2$
(b) $V_5=V_3=V_1$

When the circuit of FIG. 3 is receiving a signal on wires 13 and 14, then the voltages are as follows:

(a) $V_{in}=V_2=V_1=V_3$
(b) $V_5=V_2-V_3=0$

Note that the proper operation requires the appropriate value for resistor 37. It is believed that resistor 37 should have a value approximately equal to ¼ of the reflected primary load as seen across the ends of secondary winding 21. In other words, for a load of 900 ohms in series with 2.15 microfarads connected across tip wire 12 and ring wire 11, and a transformer turns ratio of 1:1.0495, the value of resistor 37 should be ¼ $(900+42.5)(1.0495)^2$ which is 259.529 and is approximated by resistor 37 being 261 ohms (note: frequency is 200 Hertz to 3400 Hertz).

What is claimed is:

1. A hybrid circuit for interfacing a two-wire bidirectional line and a pair of two-wire unidirectional lines, said hybrid circuit comprising:
    a transformer having a first primary winding, a second primary winding and a center tapped secondary winding;
    said first primary winding having a first end connected to a first wire of the two wire bidirectional line and a second end connected to a capacitance means;
    said second primary winding having a first end connected to said capacitance means and a second end connected to a second wire of the two wire bidirectional line;
    said first and second primary windings being interconnected in a voltage aiding serial relationship, by said capacitance means;
    an operational amplifier having a first input responsive to the signal appearing on a first one of said unidirectional lines, having a second input responsive to the signal appearing at said center tap of said secondary winding, and having an output connected directly to the first end of said secondary winding;
    a balancing network connected between said center tap and ground;
    a matching network connected between a second end of the secondary winding and ground for matching the impedance of said hybrid circuit to the impedance of said two wire bidirectional line; and
    the second one of said unidirectional lines being responsive to the signal on the second end of said secondary winding.

2. The hybrid circuit of claim 1 wherein said first unidirectional line is a receive line and wherein said second unidirectional line is a transmit line.

3. The hybrid circuit of claim 2 wherein said first input of said amplifier is a non-inverting input and said second input of said amplifier is an inverting input.

4. The hybrid of circuit of claim 1 wherein said matching network comprises a RC circuit.

5. The hybrid circuit as claimed in claim 1 wherein said balancing network comprises a resistor having one end connected to said center tap and having a second end connected to ground, and wherein said matching network comprises a capacitor having one terminal connected to said second end of said secondary winding and having another terminal connected to one side of a second resistor, said second resistor having another side connected to ground.

6. A hybrid circuit for interfacing a two-wire bidirectional port both to an unidirectional transmit port and to a unidirectional receive port, said hybrid circuit characterized by:
    a transformer having a first primary winding, a second primary winding and a center tapped secondary winding;
    said first primary winding having a first end connected to a first terminal of the bidirectional port and a second terminal connected to a capacitance means;
    said second primary winding having a first end connected to said capacitance means and a second end connected to a second terminal of the bidirectional port;
    said first and second primary windings being interconnected in a voltage aiding serial relationship, by said capacitance means;
    an operational amplifier having a first input responsive to the signal appearing on said receive port, having a second input responsive to the signal appearing at said center tap of said secondary winding, and having an output connected directly to a first end of said secondary winding;
    a balancing network connected between said center tap and ground;
    a matching network connected between a second end of said secondary winding and ground for matching the impedance of said hybrid circuit to the impedance of said two wire bidirectional line; and
    said transmit port being responsive to the signal on the second end of said secondary winding.

7. The hybrid circuit of claim 6 wherein said first input of said amplifier is a non-inverting input and said second input of said amplifier is an inverting input.

8. A hybrid circuit as claimed in claim 6 wherein said matching network comprises a RC network.

9. A hybrid circuit as claimed in claim 6 wherein said balancing network comprises a resistor connected between said center tap and ground, and said matching network comprises a capacitor having one terminal connected to said second end of said secondary winding and having another terminal connected to a first side of a second resistor, said second resistor having a second side connected to ground.

* * * * *